March 7, 1950 J. W. CURRAN 2,499,728

CODED TRACK CIRCUIT SIGNALING SYSTEM FOR RAILROADS

Filed Oct. 29, 1946 2 Sheets-Sheet 1

INVENTOR.

J. W. Curran,

BY Neil W. Preston,

HIS ATTORNEY

CODED TRACK CIRCUIT SIGNALING SYSTEM FOR RAILROADS

Filed Oct. 29, 1946 2 Sheets-Sheet 2

INVENTOR.
J. W. Curran,
BY Neil W. Preston,
HIS ATTORNEY

Patented Mar. 7, 1950

2,499,728

UNITED STATES PATENT OFFICE 2,499,728

CODED TRACK CIRCUIT SIGNALING SYSTEM FOR RAILROADS

John W. Curran, Natick, Mass., assignor to General Railway Signal Company, Rochester, N. Y.

Application October 29, 1946, Serial No. 706,329

19 Claims. (Cl. 246—34)

This invention relates to coded track circuit signalling systems for railroads and more particularly pertains to the provision in such systems of means for protecting against false signal indications in the event of a failure of the insulated joints between any two adjoining track sections.

In certain well known applications of coded track circuits to the control of automatic block signals and the like, it becomes expedient to employ code receiving means for the various track sections which is responsive to code pulses of either polarity, as shown, for example, in the prior application of J. D. Hughson, Ser. No. 647,270, filed Feb. 13, 1946, where a two-position magnetic stick type code following relay is inductively coupled to the track rails by a suitable coupling transformer. Although a relay thus coupled to the track circuit will respond to current changes due to the application and removal of neutral code pulses in spite of a limited amount of foreign current in the track rails, it may be desirable to employ code pulses of a particular polarity separated by energizations of the track rails with the opposite polarity in order to provide the most desirable results in view of certain electrical characteristics of this type of coded track circuit organization.

Also, in connection with the use of biased polar track relays of the conventional type, it may be desirable to use code pulses of a particular polarity separated by energization of the rails with energy of the opposite polarity in order to overcome certain adverse conditions. For example, in some track sections the ballast conditions are such, that the repeated application of pulses of a particular polarity acts in effect to charge the rails and ballast to a limited degree. In other track sections, the ballast conditions give the effect of a galvanic battery by producing a limited potential across the rails even in the absence of the application of code pulses. In both cases, a limited amount of foreign current is present in the track circuit and its adverse effect may be overcome by applying pulses of opposite polarities alternately.

In other cases, it may be desirable to employ short code pulses of alternate polarity at different time spaced intervals for operating a magnetic stick type of code following track relay at different rates to give different signal indications, as disclosed, for example in the prior patent, No. 2,399,760, granted to F. X. Rees, May 7, 1946.

In all of the cases mentioned above, it will be readily apparent that the usual expedient of staggering the polarities of the successive track sections is not available for broken down insulated joint detection. This is because the code receiving means associated with a forward track section in advance of a signal will respond to the code pulses applied to the track section in the rear of such signal if the insulated joints between the two sections become broken down. Such a failure of insulated joints and the improper operation of code receiving means in a forward track section by code pulses of the section in the rear, may cause under certain conditions a false signal clearing control which will result in the display of an improper indication by the associated signal. In brief, it might happen that the signal would be controlled by code pulses in the rear thereof instead of in advance and thereby under certain conditions display a clear indication although the section into which it governs traffic is actually occupied by a train.

Thus, it may be said that the primary object of this invention is to provide a simple and effective means for preventing improper signal indications in the event of the breaking down of the insulated joints between coded track circuit sections regardless of the type of code impulses and code receiving means employed.

Generally speaking, and without attempting to define the exact nature and scope of the present invention, protection against false signal indications in the event of a failure of the insulated joints associated with the signal is obtained by rendering the code transmitting means associated with the section in the rear of that signal ineffective to apply code pulses to its track section under such conditions. More specifically, an approach relay is associated with each signal location in such a way that normally it is energized by the code pulses being applied to its track section, but whenever its track section becomes occupied by a train, or the insulated joints between it and the forward section break down, it becomes effectively shunted by reason of the connection of the code receiving means across the track rails of the forward section and also because of the load characteristics of the forward track section. For this reason, the approach relay ceases its operation and renders its associated code transmitting means ineffective and at the same time causes the steady energization of its associated track section. Such an organization obviously prevents code pulses from feeding past broken down insulated joints to cause the code receiving means for the forward track section to be falsely and improperly controlled. In other words, the code receiving means of the forward track section is not operated to clear a signal unless it receives a legitimate signal control code over the track rails of its own track section.

Not only does the coded track circuit organization of this character provide protection against broken down insulated joints, but it also provides an operation of the system which protects the code applying contacts of the code transmitters. For example, when a train enters the conventional coded track circuit section, code pulses continue to be applied to that track section while the train is proceeding through the section. This causes a heavy load current to be supplied by the track battery which must be intermittently broken by the code applying contacts. However, the present invention provides that the approach of a train in a section automatically stops the coding operation in that section. This eliminates the arcing and burning effect on the code applying contacts which acts to prolong their life. In this connection, it will be appreciated that the application of steady energy to the track section still provides means by which the approach relay can detect when that section becomes unoccupied by the train.

Since the broken down insulated joint protection afforded by the present invention is embodied in a system organization involving the use of shunt type approach relays, it is desirable that such approach relays be sensitive to any abnormal conditions in their respective sections. Thus, a further object of the present invention is to provide an improved form of control for such approach relays, which control not only provides desirable characteristics to give effective broken insulated joint protection, but also provides characteristics to render the approach relays more sensitive to the approach of trains under regular operating conditions when the insulated joints between sections are intact.

Various other objects, attributes, operating characteristics and advantages of the invention will be in part apparent, and in part pointed out as the specific embodiments of the invention are described.

In describing the invention in detail, reference will be made to the accompanying drawings in which—

Figures 1, 1A:
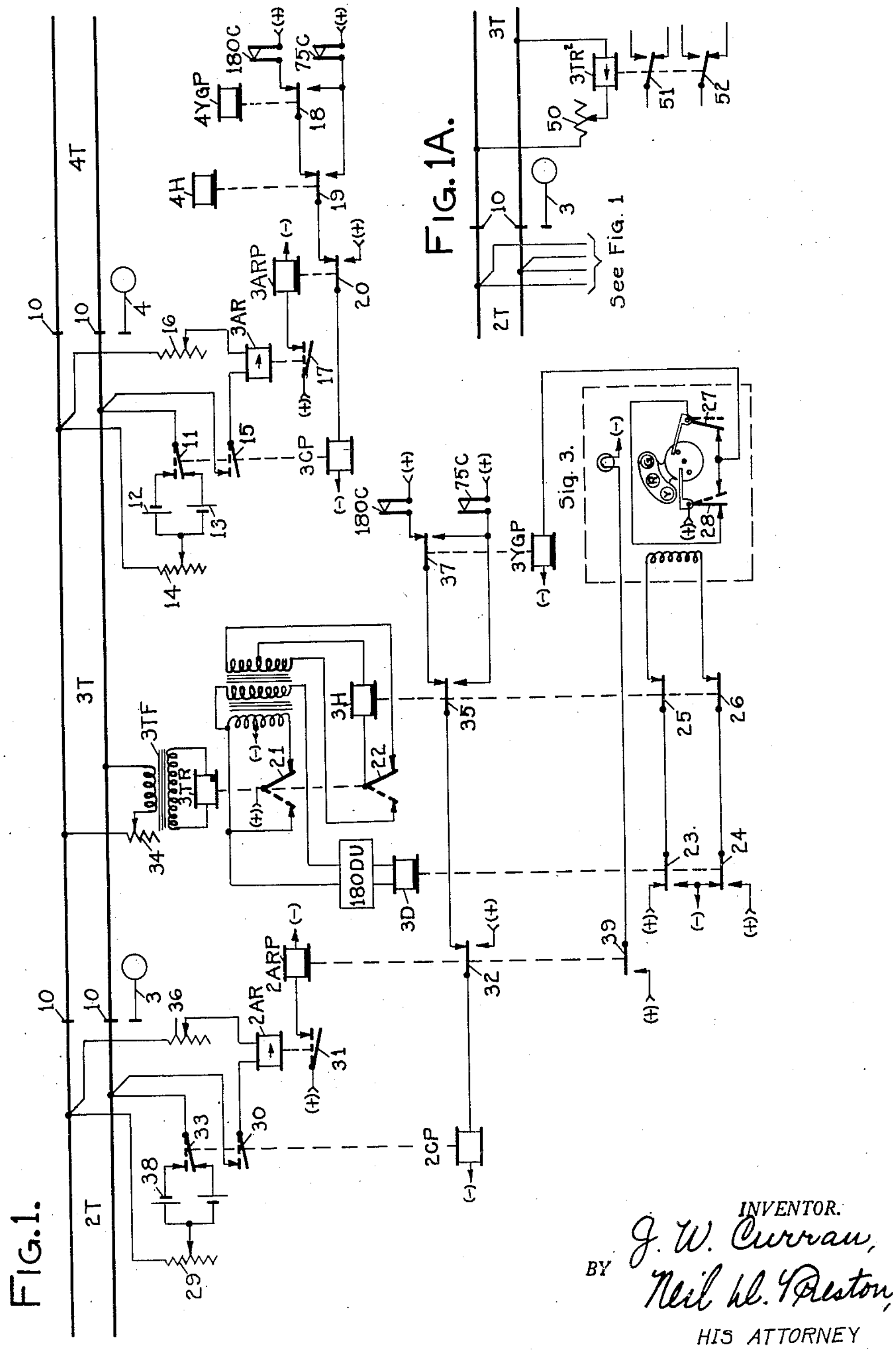
Fig. 1 is a diagrammatic illustration of a typical stretch of track having coded track circuits organized to provide the broken down joint protection of the present invention used in connection with code receiving means of the inductively coupled type.
Fig. 1A illustrates diagrammatically how the organization of Fig. 1 may be modified to employ a biased polar track relay directly connected across the track rails in place of an inductively coupled code receiving means.
Figure 1B:
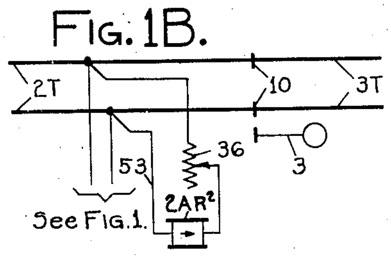

Fig. 1B illustrates how the organization of Fig. 1 may be modified to employ an approach relay directly connected across the track rails instead of being intermittently connected across the track rails by the code transmitting relay; and Figs. 2A through 2E represent graphically different electrical characteristics of the track circuit with respect to a shunt type approach relay under various conditions of the circuit.

In the drawings, parts of a similar nature are provided with similar letter reference characters with their preceding numerals indicative of the signals with which such parts are more particularly associated. Also, the schematic illustration of the embodiment of the present invention is shown in the drawings more for the purpose of facilitating the disclosure of the invention as to its mode of operation and principles of organization than for the purpose of illustrating the specific construction and arrangement of parts that would be provided in practice. For the purpose of simplifying the drawings, symbols (+) and (−) are employed to illustrate connections to the respective positive and negative terminals of a suitable battery or other source of direct current, except in connection with the track circuit itself where it is convenient to illustrate the actual battery connections.

Conventional illustrations have been shown, it being understood that different types of devices may be provided in place of the specific types shown. For example, the wayside signals are illustrated as being of the searchlight type of signal such as shown for example in the patent to O. S. Field, Pat. No. 2,239,316 dated Oct. 22, 1941, although it is to be understood that other types of signals, such as semaphore signals, position light signals, and other light signals having individual colored lamp units can just as well be employed in the practice of the invention.

Also, the code oscillators for producing the different distinctive code rates have been merely indicated as contacts designated 75C and 180C as representative of contacts which are respectively operated at 75 code rate per minute and the 180 code rate per minute by suitable structure such as shown for example by the code oscillator organization disclosed in the prior patent to O. S. Field Pat. No. 2,351,588 dated June 20, 1944. However, it should be understood that the particular type of code oscillators or coding contacts employed with the present invention is not material, and that various other types may be employed.

With reference to Fig. 1 of the accompanying drawings, it is assumed that a stretch of track is divided into a series of successive track sections, such as the track sections 2T, 3T and 4T. Each of the several sections is separated from its adjoining sections by suitable insulated rail joints 10. At the entrance to each track section is a suitable signal which governs traffic into and through that section, and typical of such signals is the signal 3 which has been indicated by a symbol adjacent the trackway with the functional structure of such signal being indicated within the associated dotted rectangle designated Sig. 3. Each of these signals is designated by a suitable numeral reference character corresponding to the numeral designating the track section over which that signal controls the traffic. This same numeral for each track section is also assigned to the other apparatus more particularly associated with that section.

At the exit end of the track section 3T, for example, is a code transmitting relay 3CP which has front and back contacts 11 for alternately connecting track batteries 12 and 13 to the track rails. Common to both battery circuits is a suitable variable or limiting resistor 14 for determining the potential applied to the track circuit for both polarities.

Also associated with the track rails at the leaving end of the track section 3T, is an approach control relay 3AR which is assumed for convenience to be of the two-position biased polar type. This relay is intermittently connected across the rails by contact 15 by a circuit including limiting resistor 16 to provide suitable adjustment under conditions later to be explained in detail. Associated with the approach control relay 3AR is a slow acting repeating relay 3ARP, which repeater relay is especially slow in its releasing characteristics although it may be relatively quicker to pick up. This is so that regardless of the particular code rate at which the approach control relay 3AR is operated, the relay 3ARP will remain picked up due to its successive energizations through front contact 17 of the approach relay 3AR, but will drop away whenever the approach relay 3AR is steadily deenergized.

The code transmitting relay 3CP is provided with an operating circuit closed from (+) and including coding contact 180C, front contact 18 of relay 4YGP, front contact 19 of relay 4H, front contact 20 of relay 3ARP, and windings of relay 3CP, to (−). This circuit provides for the operation of the code transmitting relay at the 180 code rate.

It will be apparent that when the decoding relay 4H is dropped away, the code transmitting relay 3CP is connected to the coding contacts 75C so that the code transmitting relay 3CP is operated at the 75 code rate. Under certain conditions later described, the back contact 18 of relay 4YGP is effective to also control the code transmitting relay 3CP in accordance with the 75 code rate. At those times that the approach control relay 3AR is steadily deenergized, the repeater relay 3ARP is released which opens front contact 20 and prevents the code transmitter relay 3CP from being operated at any code rate, and at the same time closes back contact 20 to steadily energize the relay 3CP and apply steady energy to the track section 3T.

At the entrance end of each track section, such as at the entrance end of the typical track section 3T, the track relay 3TR is inductively coupled to the track circuit through a coupling transformer 3TF. The secondary windings of the transformer are connected across the windings of the track relay which is of the two-position magnetic stick type relay i. e. its contacts remain in their last operated positions until the relay is energized with the opposite polarity. The primary winding of the coupling transformer 3TF is of relatively low resistance, and is connected through variable resistor 34 directly across the track rails at the entrance end of the track section 3T. Thus, in the event of the breaking down of the insulated joints, this low resistance winding becomes an effective shunt for the approach control relay 2AR for the adjoining section 2T in the rear of the signal 3.

The contacts 21 of track relay 3TR are connected to intermittently energize the decoding transformer with opposite polarities in accordance with the usual practice. This causes the secondary winding of the decoding transformer to coact with the rectifying contact 22 to supply uni-directional pulses to the slow releasing home relay 3H, which remains picked up so long as the track relay 3TR is actuated to its opposite positions by any of the usual code rates, but when the track relay 3TR ceases operation, the relay 3H is, of course, released after a reasonable length of time.

Also, associated with the decoding transformer is another secondary winding which is connected through a suitable decoding unit 180DU to a slow releasing distant relay 3D. This decoding unit 180DU includes a suitable resonator unit and rectifier organization to provide that the relay 3D is picked up only in response to a code of the 180 code rate. For other code rates, the energy passed by the decoding unit 180DU is insufficient to cause response of the relay 3D.

As shown in this typical disclosure of Fig. 1, the signal mechanism of signal 3 is of the searchlight type which has a winding energized with a normal polarity through pole changing contacts 23 and 24 to cause the signal 3 to indicate "clear or green," but if the pole changing contacts 23 and 24 assume deenergized positions, then the opposite polarity is applied to the windings of the signal so that it is caused to indicate "caution or yellow." When the relay 3H is deenergized opening the contacts 25 and 26, the winding of the signal mechanism is deenergized and the signal is caused to indicate "stop or red." When the signal indicates green the contact 27 is operated to the left which completes an obvious energizing circuit for the yellow-green signal repeating relay 3YGP, but when the signal indicates yellow the contact 27 assumes its dotted line position and the contact 28 is operated to the right to complete an obvious energizing circuit for the repeating relay 3YGP. When the signal is in the red or stop indicating position, the contact 27 assumes its dotted line position and the contact 28 assumes its solid line position so that the relay 3YGP is deenergized.

With reference to Fig. 1 and the above description of the general structural characteristics of the system, it will be seen that with no trains in track section 3T in approach to the signal 4, or in the section 4T, a regular clear code of the 180 rate is applied at the leaving end of this typical section 3T by the operation of contact 11 of relay 3CP at the 180 code rate. This means that 180 positive code pulses are applied each minute through front contact 11, while the track rails are negatively energized between successive "positive" code pulses through back contact 11.

Each change in energization of the rails from one polarity to the other causes a reversal in the magnetic flux of the coupling transformer 3TF which induces a current pulse in its secondary winding that flows through the winding of relay 3TR. For convenience in the description and illustration, it is assumed that a change from negative energization of the rails to a positive code pulse induces a pulse of current in the secondary winding of the coupling transformer in a direction to cause the contacts 21 and 22 of relay 3TR to shift to left-hand positions, while a change from a positive code pulse to negative energization of the rails induces a pulse of current in the opposite direction in the secondary winding which causes the contacts 21 and 22 of relay 3TR to shift to right-hand positions as shown. In brief, the track relay 3TR receives a short pulse of operating current at the beginning and end of each positive code pulse applied to the track section, and since these short pulses are of opposite polarities alternately, the relay operates its contacts to opposite positions alternately at a rate corresponding to the rate of the code. In the illustration it is assumed that a 180 code is being applied to the track section 3T, and for this reason both of the relays 3H and 3D are shown picked up causing the signal 3 to display a clear or green indication, and also causing the 180 code rate to be applied to the track section 2T next in the rear.

In connection with the reversal of the polarity of energization of the rails described above, it should be understood that the track relay 3TR can be similarly operated if only the application of code pulses of a particular polarity is applied to the track rails in which case the battery 13, for example, could be omitted. In other words, the organization of code receiving means illustrated is also responsive to what may be termed "neutral code pulses," but reversal of polarity of energization is desirable to provide a more effective reversal in magnetic flux in the coupling transformer. Also, since the inductive effect is dependent upon the total potential change, it will be apparent that the potential supplied successively through front and back contacts 11 is less than would be required if only battery 12 were used. This reduces the instantaneous track circuit currents which have to be broken by contact 11 and thus tends to increase the life of the coding contacts. For these reasons, the preferable form is shown in Fig. 1 as providing for the reversal in the polarity of energization of the rails between code pulses.

As mentioned above, each approach relay is intermittently connected across the track rails of its section. Referring to Fig. 1, it will be seen that the approach relay 3AR is connected through front contact 11 to the rails each time battery 12 is connected, and this connection is broken each time battery 12 is disconnected from the rails. In other words, the approach relay 3AR is connected across the rails for only the positive code pulses, and its variable resistor 16 is so adjusted that the relay 3AR responds to each such code pulse so long as the track section 3T is unoccupied. However, when the section 3T becomes occupied, the train shunt causes increased current flow from the battery 12 or battery 13 alternately through resistor 14 so that the potential applied to the rails is substantially reduced. The connection of the approach control relay 3AR during the positive pulses, which are reduced in potential during such occupied condition does not cause such approach relay to intermittently pick up, but rather it remains deenergized which in turn deenergizes its repeater relay 3ARP.

Let us assume that a clear code is being applied to each of the track sections as above described and that a train enters the track section 2T. This shunts the track relay (not shown) at the entrance end and as the train approaches the signal 3 within a suitable distance also acts to shunt the approach relay 2AR. If the track section 2T is relatively short, it may be that this will take place as soon as the train enters the section, but if the section is relatively long, it may be that the train will move into the section for a considerable distance before this shunting effect takes place. In any event, when the train provides a sufficient shunting effect across the track rails to cause an increase in current flow through the resistor 29 over and above the current flow normally required for operation of the track relay at the entrance end of that section under worst ballast condition, the potential drop across the resistor 29 is sufficient to reduce the potential applied to the track rails below that amount to which the approach relay 2AR will respond during its connection to the rails through front contact 30. This causes the contact 31 of the relay 2AR to remain in its dropped away normal position, in which the relay 2ARP is deenergized for releasing its contact 32. The release of this relay 2ARP opens front contact 32 preventing the control of the code transmitting relay 2CP in accordance with the coding contacts 180C in this case, and applies steady potential through back contact 32 so that the contact 33 of relay 2CP remains picked up supplying positive potential to the lower rail of track section 2T. This steady positive potential is also supplied to the approach relay 2AR because it is also steadily connected to the rails through front contact 30; but since the train is shunting the track rails, relay 2AR remains dropped away. Such steady energization of the relay 2CP causes the cessation of operation of front and back contacts 33 and hence they do not have to break the heavy currents which would ordinarily be present while a train occupies the section 2T.

As the train moves into the section 3T, it shunts the track rails of that section and causes the cessation of the operation of the code following track relay 3TR which in turn releases both the home relay 3H and the distant relay 3D. As the train progresses into and through this section a similar action takes place upon the approach control relay 3AR as described in connection with the approach control relay 2AR. When the train is wholly in the track section 3T, the shunting effect, of course, is not present in the track section 2T so that the relay 2AR is picked up by reason of the application of steady potential across the rails of the track section 2T. This picking up of the relay 2AR closes front contact 31 and energizes the repeating relay 2ARP which removes the steady energy from the relay 2CP and connects it to the coding contacts 75C through back contact 35 of relay 3H. This operation of the transmitting relay 2CP at the 75 code rate applies code pulses to the track section 2T which are effective to operate both the track relay (not shown) at the entrance end of the section and the approach control relay 2AR at the leaving end. This repeating of the code by the relay 2AR operates its contact 31 so as to intermittently energize the repeater relay 2ARP and cause it to maintain its contact 32 in a picked up position.

When the train enters the track section 4T and wholly leaves the track section 3T, a similar operation occurs so that a 75 code rate is applied to the track section 3T. Upon the picking up of the relay 3H in response to such 75 code, a temporary code transmitting circuit is closed from (+), through coding contact 75C, back contact 37 of relay 3YGP, front contact 35 of relay 3H, front contact 32 of relay 2ARP, and windings of relay 2CP, to (—).

However, the picking up of the relay 3H closes front contacts 25 and 26 causing the signal 3 to indicate yellow in which position the relay 3YGP is energized as previously described. This opens the temporary code transmitting circuit above pointed out, and connects the relay 2CP through front contact 37 directly to the coding contact 180C. In this way, the code rate is changed from a caution or 75 code rate in the track section 2T to a clear or 180 code rate only providing the signal 3 actually is operated to a caution or yellow indicating position. This arrangement provides that the section 2T will have the same code applied to it as is applied to the section 3T in the event of the failure of the signal 3 to actually give a caution or yellow indication. However, under usual and proper conditions the signal does give a proper caution indication so that the code rate will be changed to the next higher code rate to provide the usual three indication type of signalling.

As the train moves through and out of the track section 4T, a caution or 75 code rate is applied at the exit end of that section, which in turn causes a similar operation at the signal location 4 for applying a clear or 180 code rate to the track section 3T.

From the above description, it will be readily apparent how the organization illustrated provides that the presence and the approach of a train to each signal causes the cessation of the application of code pulses to its section so as to minimize the wear on the code applying contacts, and yet at the same time supply steady potential across the track rails for the purpose of detecting the presence of the train in a manner to restore coding operation when the train leaves the section.

Considering now the provision made for broken down joint protection it may be well to observe some of the conditions under which broken down joint conditions may occur and the operation of the system under such conditions. One typical condition is where a train passes a signal location, such as signal 3, and during the passage of the train the insulated joints become worn and broken to the extent that there is a broken down joint condition which permits the flow of current from the track section 2T into the track section 3T.

Let us assume that such a condition exists and that the train which has just passed the signal 3 moves through the track section 3 to a point at which it ceases to effectively shunt the code receiving means comprising the coupling transformer 3TF and track relay 3TR. This failure to effectively shunt the primary winding of the coupling transformer 3TF with respect to current flow from section 2T may be due in part to the linear resistance of the track rails of the section 3T and may be in part due to one or more broken bond wires used in the conventional manner to connect the successive rails of the section. Thus, code pulses applied to the leaving end of the track section 2T would be effective to intermittently energize and deenergize the primary winding of the coupling transformer 3TF and cause the operation of the track relay 3TR if it were not for the provisions of the present invention. If this occurred, it might well happen that the signal 3 would be falsely operated to caution and cause a higher or less restrictive code rate to be applied to the track section 2T which in turn would cause operation of the track relay 3TR and govern the signal 3 to give the green or clear indication falsely. This erroneous and undesired operation cannot occur in the system of the present invention for several reasons which will be presently described.

In the first place, the primary winding of the coupling transformer 3TF is of relatively low resistance so that if the insulated joints 10 become broken down, it provides an added load upon the track battery 38 which produces a sufficient voltage drop in the resistor 29 that the relay 2AR does not pick up in response to the application of positive code pulses to the track section 2T. It will also be noted that the added load on the track battery 38 is increased due to the inherent characteristics of the ballast leakage of the track section 3T. Thus, under broken insulated joint conditions, it will be obvious that the relay 2ARP drops away and applies steady potential to the transmitting relay 2CP which in turn supplies steady potential to the track section 2T. Although such steady potential may improperly flow around the insulated joints 10, it is ineffective to act on the primary winding of the coupling transformer 3TF to produce pulses to operate the track relay 3TR. For this reason, broken down insulated joints under the conditions outlined above, result in the removal of code pulses from the track section in the rear of the signal location where the insulated joints are broken down, which causes the signal at the entrance end of that section to be held at stop. Thus, the signal 3 at the location where the insulated joints are broken down, is wholly dependent upon legitimate code for clearing and can not be falsely cleared while a train is in its section. Obviously, these conditions are not transient or intermittently reoccurring conditions, so that the signal at the entrance end of this section 2T (the one to the rear of the broken insulated joints) is steadily held at stop and there are no adverse effects cascaded into the preceding track sections.

Regardless of whether a legitimate code has just been restored to the track section 3T, or whether normal coding conditions are present and the insulated joints after a prolonged period have deteriorated to the point which allows code pulses to leak past the signal location 3 to the track section 3T, the approach control relay 2AR is always present to detect such condition. This is true since the leakage of code pulses past the insulated joints provides an added load upon the track battery 38, which in turn produces a potential drop in the resistor 29 sufficient to cause the approach control relay 2AR to remain released as code pulses are applied. This added load due to the ballast conditions of track section 3T and the low resistance of the primary winding of the coupling transformer 3TF, for example, approaches the same order as the load conditions when a train is present in a track section.

Although the adjustment of the variable resistor 36 associated with the approach control relay 2AR might become improper, such condition will be self-betraying. For example, if the relay 2AR fails to pick up at all, then there will be no coding operation with respect to the track section 2T and the entering signal will be held at stop undesirably, which, of course, will bring immediate attention to the improper condition. On the other hand, if the approach control relay 2AR fails to remain released while a train is in section 2T due to improper adjustment of resistor 36 or due to the resistor 29 being improperly adjusted, then the relay 2ARP will not release upon the approach of a train to signal 3, in which event the back contact 39 does not close and the signal 3 does not display an indication. Such improper condition will immediately bring attention to the fact that there are improper conditions of adjustment with respect to the approach relay.

In the above description, consideration is given to the manner in which the low resistance primary winding of the coupling transformer 3TF and its variable resistor 34 acts upon the approach relay 2AR in the event of broken down insulated joints 10. It should be noted, however, that the same operation will occur if different types of code receiving means are used in place of the relay 3TR and coupling transformer 3TF. For example, a biased polar relay $3TR^2$ together with a limiting resistor 58 is shown connected across the track section 3T in Fig. 1A to replace the code receiving means shown in Fig. 1. This type of code receiving means responds to the polarized code pulses disclosed in Fig. 1 so as to be picked up or actuated in response to the positive code pulses and to be dropped away or not actuated during the negative energizations of the track section. The contacts 51 and 52 of this relay $3TR^2$ replace the contacts 21 and 22 of Fig. 1 so that the action of the relay on the decoding apparatus is the same as described in connection with Fig. 1.

It might also be noted that with the organization of Fig. 1 modified as indicated in Fig. 1A and as above briefly described, will also operate on neutral code pulses i. e. code pulses of a particular polarity separated by time spaces in the usual conventional way, although it is preferable to employ code pulses separated by negative energizations in the modified organization the same as is shown in Fig. 1 for the purpose of overcoming various characteristics of coded track circuits previously mentioned, such for example, as the storage battery effect and the like.

In this modified organization of Fig. 1 as indicated in Fig. 1A, the track relay $3TR^2$ and variable resistor 50 are so constructed as to have relatively low resistance to provide an additional load upon the track battery 38 in the event that the intervening insulated joints are broken down in the same manner as explained in connection with the primary winding of the coupling transformer 3TF and series resistor 34. This additional load provided by the track relay $3TR^2$ together with the additional load provided by the ballast conditions of the track section 3T act in the event of broken down insulated joints to prevent the picking up of the approach relay 2AR the same as previously explained in connection with Fig. 1. Any cessation of operation of the approach control relay 2AR whether due to the entrance of a train or the broken down insulated joints just explained, causes steady energy to be applied to the track section 2T which of course will not cause intermittent operation of the track relay $3TR^2$. As shown in Fig. 1A the application of positive potentials to the lower rail of section 2T, would cause the picking up of the track relay $3TR^2$ if the insulated joints were broken down. However, the steady energization of the relay $3TR^2$ can in no way effect the operation of the decoding relays 3H and 3D. For these reasons, it will be evident that the coded track circuit organization of Fig. 1 modified in accordance with Fig. 1A will provide the same broken down insulated joint protection as described in connection with Fig. 1.

It should be noted that the series resistor 34 associated with the coupling transformer 3TF of Fig. 1, and also the variable resistor 50 associated with the track relay $3TR^2$ of Fig. 1A, are employed in each case so that the total resistance of the particular combination used can be adjusted to be uniformly the same for each different track section. This is desirable in practice since the length of the track relay leads may vary at different signal locations, which would cause different resistance values. But it is proposed in accordance with the present invention to provide primary windings for the coupling transformers, or track relay windings, of sufficiently low resistance values that when they are combined with their respective variable resistors in series, a standard resistance value can be set for each signal location. In this connection, it might be noted that this standard resistance for the primary winding of the coupling transformer and its connections across the track rails (or the track relay and its connections as shown in Fig. 1A), should be of such a value that the maximum permissible train shunt will be effective to shunt the track section and cause the cessation of the operation of the associated code receiving means under the various ballast conditions encountered in practice.

As disclosed in Fig. 1, the approach relays are shown as being connected across the track rails only while they are energized with code pulses of a particular polarity. However, it should be understood that an approach relay may be directly connected across the track rails as shown for example in Fig. 1B where the wire 53 replaces the contact 30 of the relay 2CP in the connections for approach relay $2AR^2$. The operation of the system and the response of the approach relay $2AR^2$ to both trains and broken down insulated joint conditions is the same as explained in connection with Fig. 1 with the exception that the organization of Fig. 1 is preferable when the code pulses of a particular polarity are separated by energizations of the rails with the opposite polarity. In other words, the track circuit organization of Fig. 1 as modified in accordance with the fragmentary illustrations of Fig. 1B is especially useful in connection with coded track circuits employing coded pulses of a particular polarity with no intervening energizations of the rails with the opposite polarity; whereas the preferred form of Fig. 1 is especially desirable in connection with the use of the code pulses of a particular polarity when such pulses are separated by energization of the track rails with the opposite polarity. This is because the use of opposite polarities with a direct connected shunt type approach relay has a certain adverse effect so as to limit the range of track circuit variations over which it will be effective. However, in accordance with the present invention, the provision of the novel control for approach relays as shown in Fig. 1 not only provides proper characteristics for approach relays in connection with detecting the approach of trains, but also renders these relays especially sensitive and effective to broken down insulated joint conditions even though polarized pulses are applied to the track rails. This can best be explained by referring to the graphical illustrations of Fig. 2A through 2E.

Figure 2A:
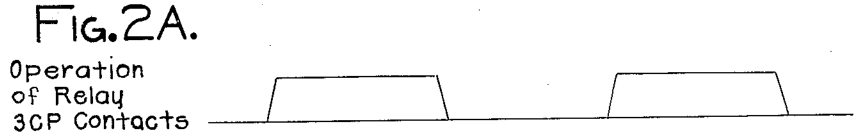

Referring to Figs. 1 and 2A, the operation of the code transmitting relay 3CP is illustrated by the diagram of Fig. 2A. The base line of this diagram represents the contacts 11 and 15 in their lower or dropped-away positions, while the upper parallel lines of the diagram represents their picked-up or dotted line positions. The pick up and release of these contacts 11 and 15 involves a certain rather definite time which has been illustrated by the slanting lines connecting the base line with the upper parallel lines.

Figure 2B:
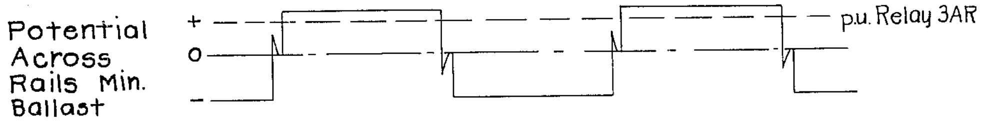

The diagram of Fig. 2B represents the potentials across the track rails as coded pulses are applied to the track rails by the contact 11. These code pulses are considered as representing conditions under minimum ballast conditions i. e. while the ballast is wet and is of a relatively low resistance. Each approach relay AR (such as 2AR, 3AR, $2AR^2$ etc.) being of the biased polar type is responsive to only a particular polarity, and may have its value of pick-up potential represented by the dotted line designated *p. u.* It will be noted that the change of the potential from one polarity to the other substantially follows the closure and opening of contact 13 of relay 3CP. Under minimum ballast conditions, the positive code pulses are just slightly greater than that required to pick up the approach relay. This is true regardless of whether the approach relay AR is connected as shown in Fig. 1, or as connected in Fig. 1B. In this connection, it will be appreciated that if the approach relay is controlled as shown in Fig. 1, the negative energizations of the rails will not be applied to the approach relay; whereas, if the connections of Fig. 1B are employed both the positive and negative energizations of the rails will be applied to the approach relay.

Figure 2C:
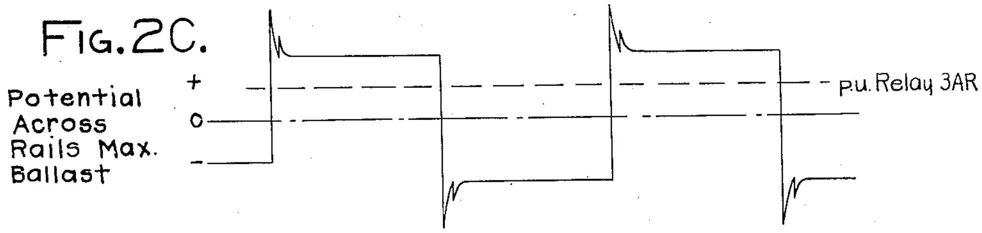

The diagram of Fig. 2C is to represent the potentials across the track rails under what may be conveniently termed maximum ballast conditions i. e. dry ballast conditions where the resistance between rails is relatively high and sometimes approaches infinity. In this case, it will be noted that the positive and negative pulse energizations of the rails not only reach higher positive and negative values respectively, but also are preceded by slightly higher peak values. This is because the current flowing in the track rails causes a magnetic flux to be built up around the rails so that upon the interruption of such current an induced potential is produced at the feed end of the track circuit which is of a slightly higher value than the value of the opposite polarity to be applied. This induced rail potential of reverse polarity does not appear in as great an amount at the feed end of the track circuit during minimum ballast conditions because the relatively low resistance of the ballast acts as a distributed resistance to drain off such charge throughout the length of the track circuit, whereas when the ballast is dry the potential accumulatively builds up and appears at the feed end of the track circuit.

Figure 2D:
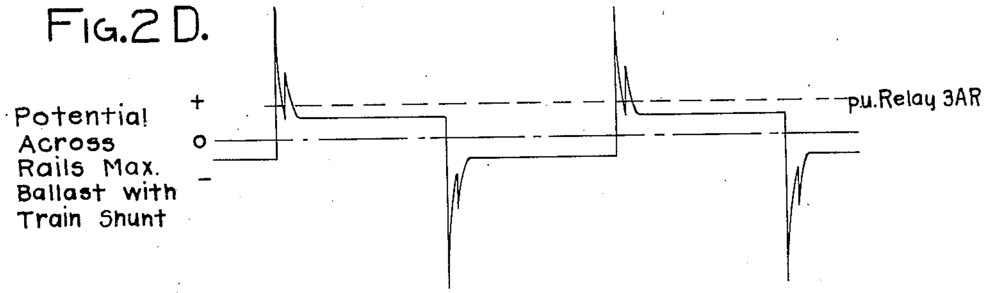

This rail induced potential, sometimes commonly termed "rail current reverse energy kick" is greatly accentuated under dry ballast conditions when a train enters the track section, because the presence of a train shunt increases the current in the track rails to a much higher value which when interrupted causes a greater reactive potential. This is illustrated in the diagram of Fig. 2D where it is seen that the reactive potential upon the shift in the polarity of energization greatly exceeds the stable pulse value after the reactive or induced potential has decayed. In both Figs. 2C and 2D, it will be noted that the closure of front contact 11, for example, causes a slight rise or peak value of secondary proportions as compared to the reactive rail potential. This is because the reactive rail potential has not wholly dissipated at the time of the closure of the front contact 11 so that the applied potential and reactive potentials are additive causing a secondary peak value. However, the amount of added energy from the decaying reactive rail potential supplied to a relay after the front contact 11 closes is relatively small and does not materially affect its operation. The presence of the train shunt actually causes the stable pulse value to fall below the pick-up value of the approach relay AR as indicated by the dotted line. But if the approach relay AR is connected as shown in Fig. 1B, the relatively high reactive potential is applied directly to the relay and will act to pick the relay up, although the value of applied pulse potential is actually below the pick-up value. Because the release value of a relay is usually below its pick-up value, it may happen that the relay will remain picked up throughout the pulse even though the stable pulse value falls slightly below the pick-up value since it may not fall below the drop-away value. For this reason, a shunt type approach relay connected as shown in Fig. 1B is not as sensitive to train shunts or broken down insulated joints under high ballast conditions when opposite polarities are applied to the track rails.

Under minimum ballast conditions the approach is also adversely affected for slightly different reasons. It is characteristic of a relay that its pick-up value upon successive energizations of the same polarity is of a particular value, whereas upon successive energizations separated by energizations of the opposite polarity the pick-up value is raised. This is because of the inherent characteristics of a magnetic structure commonly known as its hysteresis characteristics. Thus, under minimum ballast conditions indicated in Fig. 2B when the opposite polarities are applied to the approach relay by reason of the connection shown in Fig. 1B, the pick-up value of the approach relay 2AR[2] is in effect raised, so that the approach relay is not as sensitive for various minimum ballast conditions. For this reason, it will be apparent that the approach relay as connected in Fig. 1B will not be as sensitive to the entrance of trains and broken insulated joint conditions when energizations of the opposite polarities are employed as if all the energizations of the track circuit were of the same polarity.

Figure 2E:
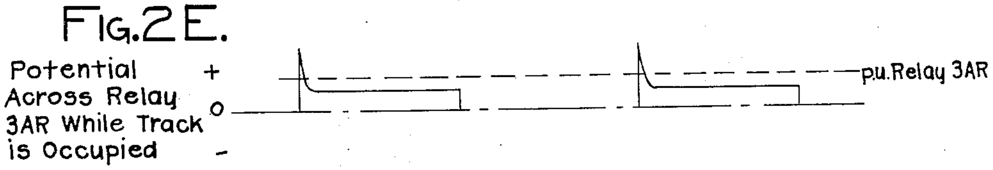

From the above description, it will be apparent that the approach relay of Fig. 1B should preferably be employed when neutral code pulses are used, but when polar code pulses are used the approach control of Fig. 1 is preferable. This preferred form of Fig. 1 for polar impulses is effective to render the approach relay more sensitive, since the opening of contact 15 when the rails are negatively energized renders the relay more sensitive under minimum ballast conditions, while the cross-over time of the contacts 11 and 15 eliminates the application of the peak rail reactive potential illustrated in Fig. 2D as preceding each positive code pulse under maximum ballast conditions. This causes the potentials applied to the approach relays 2AR, 3AR etc. of Fig. 1 to appear as shown in Fig. 2E. If the cross over time of the contacts is relatively long compared to the reactive potential of the rails, then such reactive potential is not applied to the approach relay at all, but if the crossover time of the contacts is not sufficient to allow the reverse surge to completely decay there will be a slight rise above the stable pulse values at the beginning of every pulse which is insufficient both in value and duration to materially affect the operation of the approach relay. This has merely been indicated in Fig. 2E to illustrate the condition, it being understood that the crossover time of the contacts should be made sufficiently great to allow the major portion of the induced potential to dissipate before the approach relay is connected to the rails. In the event, that the reactive rail potential exists for too long a time to be wholly eliminated by the crossover time of the contacts of the relay 2CP or 3CP, for example, then a repeater relay may be employed. More specifically, a front contact repeater of the relay 3CP may be provided with a front contact connected the same as contact 15 of Fig. 1. In view of the above description, it will be apparent to those skilled in the art that an improved control has been provided for shunt type approach relays when used in connection with pulses of opposite polarities.

Having thus described a coded track circuit organization as one embodiment of the present invention, it is desired to be understood that this organization is selected to facilitate in the disclosure of the invention rather than to limit the number of forms which it may assume; and, it is to be further understood that various modifications, adaptations and alterations may be made to the specific form shown to meet the requirements of practice, without in any manner departing from the spirit or scope of the present invention.

What I claim is:

1. In a coded track circuit signalling system, two adjoining track circuit sections separated by insulated joints, code transmitting means associated with the rear section at the adjoining location for applying distinctive code pulses across the rails of that rear section, approach control means including an approach relay associated with the rails of said rear section normally effective to follow the code pulses applied to that section but being rendered inactive when that section is shunted, a code receiving means connected across the track rails of the forward section at said adjoining location and effective to shunt said approach relay if said insulated joints are broken down, and means controlled by said approach control means when inactive for preventing the transmission of code pulses in said rear section.

2. In a coded track circuit signalling system, a stretch of track divided into a plurality of successively adjoining track sections separated by insulated joints, code transmitting means at the leaving end of each track section for applying code pulses at different distinctive rates across the track rails of its section, code receiving means connected across the track rails at the entering end of each track section, approach control means associated with the track rails at the leaving end of each track section so as to be normally responsive to the respective code pulses applied to its section by the associated code transmitting means but rendered inactive whenever the track rails of that section are shunted, and means controlled by each approach control means when it is in an inactive condition for acting upon its associated code transmitting means to stop code transmission and apply steady energy to its track section, whereby the breaking down of the insulated joints between any pair of track sections causes the code receiving means of the forward section to shunt the approach control means of the rear section and stop the code transmission in such rear section to thereby prevent itself from being governed by an erroneous code.

3. In a coded track circuit signalling system, a stretch of track divided into a plurality of adjoining track sections, a normally active code transmitter connected to the track rails of each of the track sections at the exit end, a track relay connected across the track rails of each of said track sections at the entrance end, approach control means connected across the track rails at the exit end of each of said track sections normally active to respond to the respective pulses of said code transmitter but rendered inactive by the shunting of the track rails of that track section, and means governed by said approach control means of each section for rendering said track circuit code transmitter for that track section actively controlled in accordance with the code received by said track relay of the next adjoining section only when said approach control means is active.

4. In a coded track circuit signalling system of the character described, a stretch of track signalled for one direction of traffic and signals for governing the entrance of traffic to each of a plurality of adjoining track sections, a normally active code transmitter associated with the exit end of each of said track sections for intermittently connecting a source of energy and a series resistor across the track rails of that section, a track relay connected across the track rails of each of said track sections at the entrance end for controlling each of said signals in accordance with the code transmitted through the track rails in advance of that signal, approach control means connected across the track rails at the exit end of each of said track sections, such approach control means being normally active in response to the respective code pulses normally applied to that track section by said code transmitter, but rendered inactive upon a substantial increase in the current flow from the source of energy through the series resistor of that track section, and means governed by said approach control means for permitting the transmission of code pulses in that track section only in the absence of said increase in track circuit current, whereby the code transmitter for each track section is rendered inactive upon the approach of a train to the signal governing traffic into the track section in advance.

5. In a coded track circuit signalling system, two adjoining track circuit sections separated by insulated joints, a signal located adjacent said insulated joints, code transmitting means associated with the section to the rear of said signal for applying code pulses across the rails of that section, an approach relay also connected across the rails of said rear section for following the code pulses, approach control means rendered active while said code following approach relay is energized either by code pulses or by steady energy applied to the rails by said code transmitting means but rendered inactive whenever said rear track section is shunted and said code following approach relay becomes effectively deenergized code receiving means connected across the track rails of the forward track section at said signal location and responsive to code pulses in that section for governing said signal, said code receiving means being effective to shunt said code following approach relay if said insulated joints are broken down, and means controlled by said approach control means when active for causing said code transmitting means to be governed by said code receiving means but when inactive for causing said code transmitting means to be steadily energized for applying steady energy to said rear track section.

6. In a coded track circuit signalling system, two coded track circuit sections adjoining each other at a signal location and separated by insulated joints, code transmitting means associated with the section to the rear of said signal for applying code pulses to that section, an approach relay associated with the rails of said rear section adjacent said insulated joints and responsive to the code pulses applied by said code transmitting means, a slow acting repeater relay associated with said approach relay so as to be picked up when said approach relay is either steadily or intermittently energized, a code following track relay connected across the rails of said section in advance of said signal, said code following track relay being of relatively low resistance for effectively shunting said approach relay if said insulated joints are broken down, decoding means controlled by said code following track relay for governing the indications of said signal, and contact means operated by said slow acting relay when it is picked up to cause said code transmitting means to be governed by said decoding means but acting when dropped away for causing said transmitting means to apply steady energy to said track section to the rear.

7. In a coded track circuit signalling system, two adjoining track circuit sections separated by insulated joints at a signal location, code transmitting means associated with the section to the rear of said signal for intermittently applying code pulses across the rails of that section, an approach relay associated with the rails of the rear section and responsive to the application of code pulses or steady energy to that section, code receiving means associated with the section in advance of said signal and including a code following relay inductively coupled to the track section by a coupling transformer having a relatively low resistance primary winding connected across the track rails of that section, decoding means controlled by said code following relay, and approach control means for causing said code transmitting means to be governed by said decoding means to determine the character of the code to be transmitted while said approach relay is energized either intermittently or steadily but to cause said code transmitting means to be steadily energized for applying steady energy to said rear track section while said approach relay is steadily deenergized.

8. In a coded track circuit signalling system, one coded track circuit section being separated from an adjoining coded track circuit section by insulated joints, said insulated joints being adjacent a signal location, code transmitting and receiving means associated with said coded track circuit sections for transmitting selected distinctive codes over their respective sections, approach control means associated with the section to the rear of said signal normally active to follow the pulsing of energy applied to its associated section and effective to interrupt the application of code pulses to that section while said approach control means is rendered inactive due to the shunting of the rails of that section either by a train or other means, said approach control means when interrupting the transmission of code also acting to cause the steady energization of the associated track section and said code receiving means for the forward track section including low impedance means connected across the rails of its section, whereby in the event of the breaking down of said insulated joints, the code receiving means of the forward section effectively shunts the approach control means of the section to the rear to thereby prevent the operation of the code receiving means of the forward track section by code pulses from the rear track section.

9. In a coded track circuit signalling system, two adjoining track circuit sections separated by insulated joints, a signal located adjacent said insulated joints, a code transmitting relay associated with the rear section and acting when energized to connect a source of energy across the track rails of its section to thereby transmit spaced code pulses, an approach relay also connected across the rails of said rear section and responsive to the energized and deenergized condition of such section, code receiving means associated with the track section in advance of said signal and responsive to the code pulses in its section for governing the indication of the associated signal, circuit means for controlling said code transmitting relay in accordance with the condition of said code receiving means including a front contact closed only if said approach relay is intermittently or steadily energized, and circuit means for steadily energizing said code transmitting relay when said approach control relay is steadily deenergized.

10. In a coded track circuit signalling system, a stretch of track divided into a plurality of adjoining track sections separated by insulated joints, signals located adjacent said insulated joints for governing traffic in one direction, code transmitting means associated with the leaving end of each track section for applying code pulses across the track rails at selected distinctive rates in accordance with traffic conditions in the next track section in advance, code receiving means connected across the track rails at the entering end of each track section and acting in accordance with the distinctive code received for governing the indications of the associated signal, an approach relay associated with the track rails at the leaving end of each track section so as to be normally active in response to code pulses or steady energization applied to its section, and means controlled by each approach relay when it is energized either steadily or intermittently to cause the associated code transmitting means to be governed by the code receiving means for the next track section in advance but acting whenever it is deenergized by reason of the effective shunting of its associated section for stopping code transmission of its associated code transmitting means and causing the steady energization of its associated track section.

11. In a coded track circuit signalling system, two adjoining track circuit sections separated by insulated joints, a signal located adjacent said insulated joints for governing traffic out of one section and into the other section, a code transmitting relay associated with the section to the rear of said signal and acting when energized to connect a source of energy across the track rails of its section through a series resistor, an approach relay associated with the rails of said rear section and responsive to the energized condition of that section, code receiving means associated with the track section in advance of said signal and responsive to code pulses in its section for selecting the different indications to be displayed by the associated signal, circuit means for causing said code transmitting relay to be intermittently energized at selected distinctive code rates in accordance with the condition of said code receiving means, said circuit means including a front contact closed only if said approach relay is intermittently or steadily energized, circuit means for steadily energizing said code transmitting relay when said approach control relay is steadily deenergized, and circuit means for causing said signal to display the selected indication only provided said approach relay is steadily deenergized.

12. In a coded track circuit signalling system, two coded track circuit sections adjoining each other at a signal location and separated by insulated joints, code transmitting means associated with the section to the rear of said signal for applying code pulses to that section, said code transmitting means including a code transmitting relay for connecting a source of energy through a series resistor to said section when such relay is energized, an approach relay connected across the rails of said rear section adjacent said insulated joints so as to be responsive to the code pulses applied by said code transmitting means, a slow acting repeater relay associated with said approach relay so as to be picked up only when said approach relay is either steadily or intermittently energized, code receiving means associated with the section in advance of said signal and including a winding of relatively low resistance connected across the rails of said section for effectively shunting said approach relay if said insulated joints are broken down, decoding means controlled by said code receiving means for selecting the indications to be displayed by said signal, circuit means for operating said code transmitting relay in accordance with selected distinctive codes as selected by said decoding means, said circuit means including a front contact of said slow acting relay, circuit means including a back contact of said slow acting relay for causing said code transmitting relay to be steadily energized when said slow acting relay is dropped away, and circuit means including a back contact of said slow acting relay for causing said signal to display the indications selected by said decoding means only providing said approach relay is steadily deenergized.

13. In a coded track circuit signalling system, a track circuit section having an approach relay associated with its leaving end said approach relay being normally active in response to respective code pulses or steady energization applied to the rails of said section but being rendered inactive whenever that section is effectively shunted, and code transmitting means also associated with the leaving end of said section for applying code pulses to that section when said approach relay is active and applying steady energy whenever said approach relay is rendered inactive.

14. In a coded track circuit signalling system, a track circuit section having code transmitting means associated with the leaving end of that section for applying code pulses of opposite polarities alternately across the rails of said section, an approach relay also associated with the leaving end of said section, and means governed by said code transmitting means for connecting said approach relay across the rails of said section only when code pulses of a particular polarity are applied thereto.

15. In a coded track circuit signalling system of the character described, a stretch of track divided into a plurality of adjoining track sections each of which has a signal for governing the entrance of traffic in the same direction, a code transmitter associated with the exit end of each track section for intermittently applying code pulses of a particular polarity across the rails of that section and applying the opposite polarity to the rails between successive code pulses, code receiving means connected across the track rails of each of said track sections at the entrance end thereof for governing the indications of the signal in accordance with the code pulses transmitted through that section, an approach relay associated with the exit end of each section, circuit means for each approach relay governed by the associated code transmitter for connecting its approach relay across the track rails of its section during the application of each code pulse of said particular polarity to the track rails of that section, whereby said approach relay is normally active in response to the application of code pulses but is rendered inactive upon the shunting of the rails of that section, and circuit means governed by the approach relay for each section for rendering the associated code transmitter for that section active when the approach relay is active but applying a steady potential across the rails of its section when the approach relay is inactive.

16. In a coded track circuit signalling system, a track circuit signalling section having code transmitting means associated with the leaving end of that section for applying code pulses of a particular polarity and for energizing the track rails of its section with the opposite polarity between successive code pulses, an approach relay also associated with the leaving end of said section, and circuit means governed by said code transmitting means for connecting said approach relay across the rails of said section only during the application of each code pulse of a particular polarity, said means acting to delay the connection of said approach relay for a time subsequent to the removal of said energization of the rails of opposite polarity just preceding the application of a code pulse.

17. In a coded track circuit signalling system, two adjoining track circuit sections separated by insulated joints, a signal located adjacent certain insulated joints, a code transmitting relay associated with the rear section and acting when energized to connect a source of energy of a particular polarity across the track rails of its section and acting when deenergized to connect a source of energy of the opposite polarity across the rails of its section, an approach relay also associated with the rails of said rear section, and means governed by said code transmitting relay only when it is energized for connecting said approach relay across the rails of said section, code receiving means associated with the track section in advance of said signal and responsive to the code pulses of its section for governing the indications of the associated signal, circuit means for controlling said code transmitting relay in accordance with the condition of said code receiving means including a front contact closed only if said approach relay is intermittently or steadily energized, and circuit means for steadily energizing said code transmitting relay when said approach relay is steadily deenergized by reason of the effective shunting of the rails of said rear section.

18. In a coded track circuit signalling system, two adjoining coded track circuit sections separated by insulated joints at a signal location, code transmitting means associated with the section to the rear of said signal for applying code pulses to that section, said code transmitting means including a code transmitting relay for connecting a source of energy of one polarity through a series resistor to the rails of said section when such relay is energized and for connecting a source of energy of opposite polarity through a series resistor to the rails of said section when such relay is deenergized, an approach relay associated with the rails of said rear section adjacent said insulated joints and governed by said code transmitting means so as to be connected to said rails only when said code transmitting relay is connecting said source of energy of said particular polarity, to thereby be responsive to the code pulses applied by said code transmitting means but to be rendered inactive when the rails of its section are effectively shunted, a slow acting repeater relay associated with said approach relay so as to be picked up only when said approach relay is either steadily or intermittently energized, code receiving means associated with the section in advance of said signal and including a winding of relatively low resistance connected across the rails of said section for effectively shunting said approach relay if said insulated joints are broken down, decoding means controlled by said code receiving means for selecting the indications to be displayed by said signal, circuit means for operating said code transmitting means in accordance with the different distinctive codes selected by said decoding means, said circuit means including a front contact of said slow acting relay, circuit means including a back contact of said slow acting relay for causing said code transmitting relay to be steadily energized when said slow acting relay is dropped away, and circuit means including a back contact of said slow acting relay for causing said signal to display the indications selected by said decoding means only providing said approach relay is steadily deenergized.

19. In a coded track circuit signalling system, two adjoining coded track circuit sections separated by insulated joints, code transmitting and receiving means associated with each of said track sections, said code transmitting means for one section being governed by the code receiving means of the next adjacent section, and means associated with said one of said sections including an approach control relay connected across the track rails and normally active in response to each pulse so as to be rendered inactive by any abnormal shunting of its track rails, said approach relay when inactive being effective to prevent the application of code pulses to its section by the associated code transmitting means for that section independently of the code receiving means governing that transmitting means.

JOHN W. CURRAN.

REFERENCES CITED

The following references are of record in the file of this patent:

UNITED STATES PATENTS

| Number | Name | Date |
|---|---|---|
| 2,122,379 | Preston | June 28, 1938 |
| 2,354,024 | Jerome | July 18, 1944 |
| 2,356,460 | Laurenson | Aug. 22, 1944 |
| 2,357,546 | Preston | Sept. 5, 1944 |